United States Patent [19]

Jones et al.

[11] Patent Number: 5,083,358

[45] Date of Patent: Jan. 28, 1992

[54] METHOD OF PREVENTING TWISTED-OFF BOLT HEAD WHILE TIGHTENING A BOLT

[75] Inventors: Jack D. Jones, Lima; James D. Knebel, Delphos, both of Ohio

[73] Assignee: Aircraft Dynamics Corporation, Elida, Ohio

[21] Appl. No.: 187,630

[22] Filed: Apr. 28, 1988

[51] Int. Cl.⁵ .............................................. B23P 19/04
[52] U.S. Cl. .............................................. 29/525.2
[58] Field of Search ............... 29/525.2, 270; 81/58.1, 81/436, 437, 438, 439, 440, 441, 464, 465, 466

[56] References Cited

U.S. PATENT DOCUMENTS

| | | | |
|---|---|---|---|
| 3,861,250 | 1/1975 | Zugai | 81/464 |
| 4,380,942 | 4/1983 | Fenton | 81/436 |
| 4,468,826 | 9/1984 | Moore, Jr. | 81/464 X |
| 4,503,737 | 3/1985 | Di Giovanni | 81/441 X |
| 4,563,922 | 1/1986 | Wheeler | 81/441 |
| 4,619,162 | 10/1986 | Van Laere | 81/464 |
| 4,716,793 | 1/1988 | Tauber | 81/441 X |

FOREIGN PATENT DOCUMENTS 662318 12/1951 United Kingdom ............... 81/436

*Primary Examiner*—Timothy V. Eley
*Assistant Examiner*—Peter Dungba Vo
*Attorney, Agent, or Firm*—Sidney W. Millard

[57] ABSTRACT

To prevent the head of small sized bolts from being twisted off by a rotary electrically powered impact tool, a structure is provided between the outlet drive of the impact tool and the head of the bolt to minimize the torque transmitted between the impact tool and the bolt head.

13 Claims, 1 Drawing Sheet

METHOD OF PREVENTING TWISTED-OFF BOLT HEAD WHILE TIGHTENING A BOLT

FIELD OF THE INVENTION

This invention relates to an apparatus and process for tightening bolts into a bolt hole with an electric impact tool, said tool including a means for limiting the torque sufficiently that the tool will not shear the head of the bolt from the shaft even with the full power of the tool.

BACKGROUND OF THE INVENTION

Impact tools fitted with appropriate sockets to tighten or loosen nuts and bolts are well known. However, there is a problem where the same gun is used with a plurality of sizes of bolts. When the gun has sufficient rotary power to tighten large bolts adequately, for example three-quarter inch bolts, then the same gun has the power to twist the head off three-eighths inch bolts under full power. As a result the heads of small bolts are twisted off and great problems are often encountered in removing the broken shaft from the bolt hole, rethreading the bolt hole and reinserting another bolt. It is not practical to have one impact tool for every size of bolt.

In trying to solve the problem where only one gun will be available to the workman one must consider the parameters. In this instance the tool is operating on a source input of about twenty-four to about twenty-eight volts DC, thirty amperes DC, the gun having a one-half inch square drive and a minimum developed torque of about two hundred seventy-five foot pounds.

The first attempt to solve this head shearing problem was to try to control the current in the electrical circuit by use of resistors. Unfortunately, the results were inconsistent and no satisfactory result could be achieved. In particular the impact tool for tightening the bolts was operating on Grade 5 bolts which were being tightened into a metallic bolt hole. The available gun used a hexagonal socket to fit over the head of the bolt and it consistently twisted off the heads of five-sixteenth and three-eighths inch bolts when full power was applied.

SUMMARY OF THE INVENTION

As a result of the experiments in attempting to limit the torque appropriately, a theory was formed that the maximum radial dimension of the head of the bolt was, in fact, a lever arm receiving an impact from the rotary impact tool. That is, the impact power of the tool was being applied at the maximum radius of the head measured from the axis of the bolt shaft to the tips of the corners of the bolt head. As a result of this theory it was decided that one might be able to limit or control the power transmitted between the impact tool and the bolt head by controlling the radius of the driving force on the bolt head.

One mechanism for doing this is to modify the connection between the drive lug of the impact tool and the head of the bolt. A socket is provided for connection to the drive lug and is further provided with means therein which will transmit only a limited torque to the bolt head. A series of detents and ball bearings, or the like, may be suitably located in the socket and configured to "slip" when a specific torque is achieved. This causes the part of the connecting socket mounted on the power lug to rotate but the limiting detent does not allow the socket immediately in engagement with the bolt head to rotate after a certain maximum torque is achieved.

In the course of experiments and based upon the aforementioned theory of the maximum radius for impact transmission, another technique has been discovered. Where the bolt size is three-eighths inches or smaller, if a hexagonal slot is formed in the head of the bolt to receive an Allen wrench-type insertion then torque limiting ability is achieved by limiting the size of the Allen wrench. Specifically using Grade 5 bolts, where the bolt size is five-sixteenths inch, a standard one-quarter inch Allen wrench drive will not shear the head off the bolt when the maximum power of the impact wrench is applied; where the bolt size is three-eighths inches and the Allen wrench is five-sixteenths inches and full power is applied by the impact wrench the head will not be sheared from the shaft. In discussing "full power" throughout this application it is intended to mean an input voltage of about twenty-four to about twenty-eight volts DC, about thirty amperes DC minimum while impacting at input voltage of about twenty-eight volts (at the outlet of the power source), using a cable about forty feet in length, a reversible electrical impact wrench having a one-half inch square drive, a minimum of about 1750 RPM at the indicated input, about 1750 impacts per minute at the indicated input and a power generation of about 275 foot pounds minimum in three seconds.

Objects of the invention not understood from the above will be clear from a review of the drawings and the detailed description of the preferred embodiments which follow.

DESCRIPTION OF THE PREFERRED EMBODIMENTS

Figure 1:
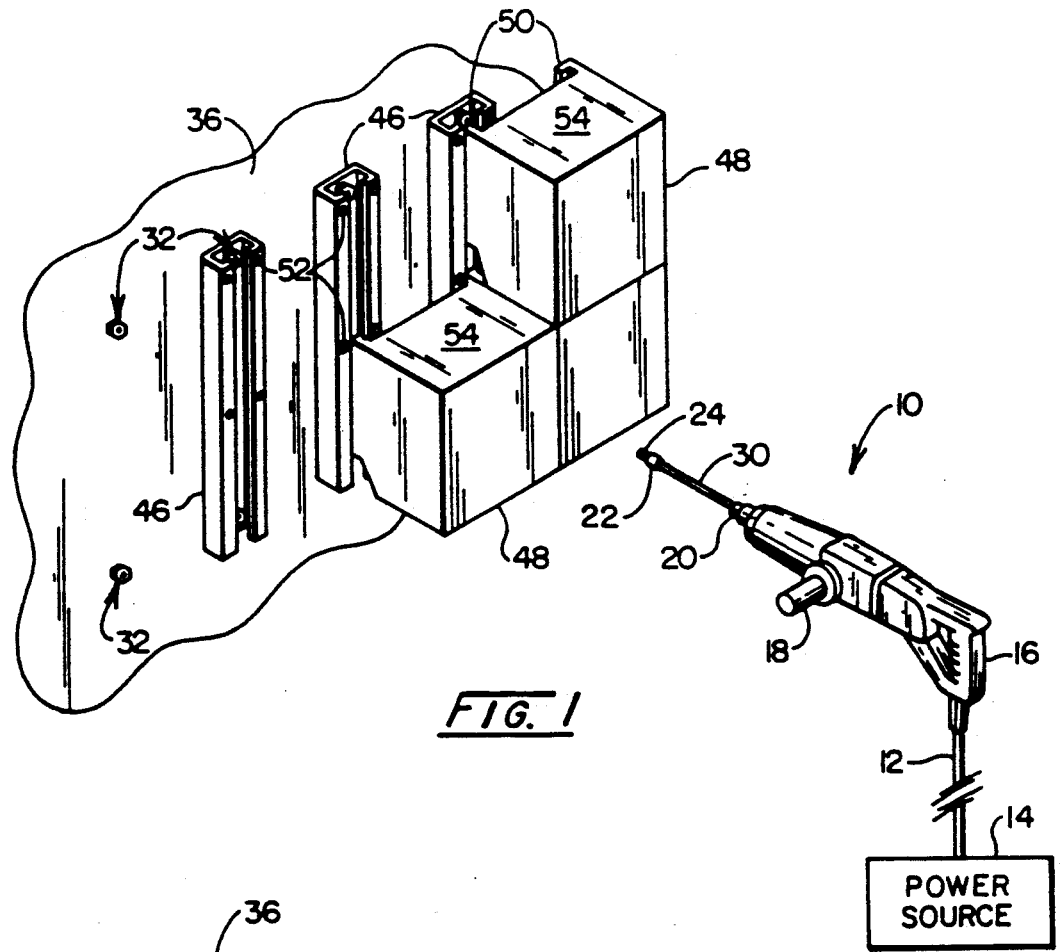
FIG. 1 is a fragmentary perspective view of an environment where this invention would be used.

FIG. 1 shows a rotable impact tool or gun 10 connected by a cable 12 to a power source 14. For purposes of this invention the power source may be a battery or a generator producing an output voltage of from about twenty-four to about twenty-eight volts DC with a current of about thirty amperes DC minimum with the twenty-eight volt output.

Figure 4:
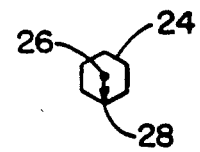
FIG. 4 is an end view of the tool of FIG. 2 useful in tightening the bolt according to this invention.

The gun 10 has suitable handles 16 and 18 for manually supporting the gun and a trigger actuator (not shown) is mounted in the D-shaped handle 16. On the power drive end of the gun is a square one-half inch drive lug 20 and attached thereto is a tool 22 with a socket on one end and a hexagonal prong 24 on the other end. The preferred shape of the prong is hexagonal as best seen in FIG. 4.

In the preferred embodiment an Allen wrench-type prong is used but the exact polygonal shape is not critical, it could have from three to eight sides. What is critical is the radial or diagonal dimension from the wrench axis 26 to the maximum outer dimension at the corner 28 of the polygonal shape, as will be explained in more detail subsequently.

Looking again to FIG. 1, the tool 22 is shown connected to the drive lug 20 by an extension 30. This is purely optional and may or may not be used in the inventive concept, depending upon the circumstances.

Figure 2:
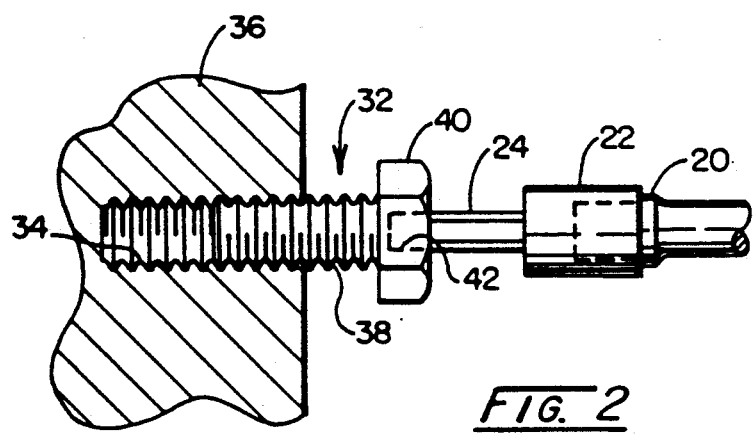
FIG. 2 is a fragmentary sectional view showing the connection between the head of a bolt to be tightened and the tool fitting into a slot in the bolt head.
Figure 3:
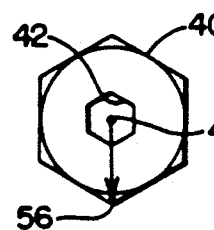
FIG. 3 is a top plan view of the head of the bolt of FIG. 2.

Gun 10 is poised in operative position to remove a bolt 32 from a threaded bolt hole 34 (best seen in FIG. 2) in a metallic substrate 36. The bolt itself includes a threaded shaft 38 having a hexagonal head 40 on one end. As best seen in FIG. 3 the head 40 includes a hexagonal slot or depression 42 oriented coaxially with the axis 44 of the shaft 38. Slot 42 is designed to receive the Allen wrench prong 24 in closely fitting relationship to provide the drive mechanism for tightening the bolt 32 into the bolt hole 34.

Looking again to FIG. 1, two bolts 32 are aligned vertically and may be removed for purposes of fitting a channel 46 into place adjacent the substrate 36 and then the bolts 32 may be reinserted and tightened to hold the channel in place. With the channels rigidly attached to the substrate, blocks of material 48 may be mounted thereon. Each block 48 has a pair of L-shaped flanges 50 formed on one side which may slip into the C-shaped channels 46 and be supported in position by some shelf, lug or the like which limits downward passage (not shown).

Note bolt holes 52 in the face of flanges of channels 46. These holes are designed to receive cap screws which would fit above the upper surface 54 of each side of each block to prevent the vertical movement of block 48 after it is seated in place on channels 46.

Looking again to FIGS. 3 and 4, it is believed that the reason an impact wrench operating under the parameters indicated above is capable of shearing the head of a Grade 5 bolt having a shaft diameter smaller than three-eighths inches when the full power of the gun 10 is applied is that the power is applied through a lever arm of a length from 44 to 56 as illustrated in FIG. 3. This occurs when a conventional hexagonal socket is mounted about the periphery of the bolt head 40. It is believed that the force is thus applied at the maximum radial dimension from the axis 44 of the shaft to the outermost corner of head 40. Mechanical shearing is prevented by using an Allen head-type wrench 24 to fit into the slot 42 because the maximum radius for impact is much smaller, from 26 to 28 as illustrated in FIG. 4. Compare the two distances illustrated in FIGS. 3 and 4 and, for illustration purposes only, consider the Figures to be drawn to scale.

It has been discovered that where one has a bolt size of five-sixteenths inches, a standard Allen wrench drive of one-quarter inch used on gun 10 will not shear the bolt head from the shaft. Neither will a standard Allen drive of five-sixteenths inches shear a bolt shaft of three-eighths inches under the same circumstances.

The discussion has been of the radial dimensions of the largest radial dimension on the bolt head where the impact is applied. In discussing the polygonal drive dimensions, reference has been made to "standard Allen wrench" dimensions. Standard Allen wrenches are sized by the diagonal measurement through the wrench axis to opposed flats, not the tips of the corners. A calculation of the dimension through the wrench axis from one corner to the opposite corner will reveal that the corner to corner dimension for a standard one-quarter inch Allen wrench will be less than about five-sixteenths inches and for a standard five-sixteenths inches Allen wrench it will be less than about three-eighths inches. These facts lead to the conclusion, based solely upon actual tests in the field and with a torque wrench operating under the parameters set out above, that the torque wrench will not shear the head from the bolt if the maximum radial dimension to receive the impact is not substantially greater than the radial dimension of the bolt shaft.

Having thus described the invention in its preferred embodiment it will be clear that variations can be made in the apparatus and process without departing from the spirit of the invention. For example, some mechanical attachment between the drive lug and the bolt head which does not include an Allen wrench type engagement could be used where the effective torque transmission to the bolt head would be at a radial dimension not substantially greater than the bolt shaft radius. It is not intended that the invention be limited by the words used to describe the invention nor the drawings showing the same. Rather it is intended that the invention be limited only by the scope of the appended claims.

What is claimed is:

1. A process for mechanically tightening a bolt while preventing the bolt head from being sheared from the bolt shaft comprising,
   providing a threaded bolt hole and a bolt having a threaded shaft with a head on one end,
   providing a mechanically powered gun of sufficient rotary power which could shear the head of the bolt from the shaft with said power applied at the periphery of the head,
   said gun having a rotable drive lug at one end,
   attaching to said drive lug a means for engaging said head, said engaging means being configured to limit the power transmitted from said gun to said head to an amount which will not shear the head from the shaft,
   threading the bolt into the hole,
   engaging the head of the bolt with said engaging means,
   applying the full power of the gun to fully tighten the bolt into the hole without shearing the bolt head from the shaft.

2. The process of claim 1 wherein said bolt is Grade 5 and when its shaft has a diameter of about five-sixteenths inches, a polygonal slot in the head having a maximum diagonal dimension not substantially greater than about five-sixteenths inches.

3. The process of claim 1 wherein said bolt is Grade 5 and when its shaft has a diameter of about three-eighths inches, a polygonal slot in the head having a maximum diagonal dimension not substantially greater than about three-eighths inches.

4. The process of claim 1 including a slot in the head of the bolt substantially coaxially aligned with the shaft, said slot having a polygonal periphery,
   said engaging means including a prong for fitting into said slot, said prong having about the same peripheral dimensions as said slot,
   providing the prong as the only power transmitting connection between said gun and said bolt,
   dimensioning the slot and the prong with a maximum radial dimension which is less than a radial dimension which is great enough to shear the head from the bolt shaft when the full power of the gun is applied to the prong to tighten the bolt.

5. The process of claim 2 wherein said bolt is Grade 5 and when its shaft has a diameter of about five-sixteenths inches, the polygonal slot in the head has a maximum diagonal dimension not substantially greater than about five-sixteenths inches.

6. The process of claim 2 wherein said bolt is Grade 5 and when its shaft has a diameter of about three-eighths inches, the polygonal slot in the head has a maximum diagonal dimension not substantially greater than about three-eighths inches.

7. The process of claim 4 wherein the gun is an impact tool having a minimum capacity of about two hundred seventy-five foot pounds when operating with an electrical source input of about twenty-four to about twenty-eight volts DC and a minimum of about thirty amperes.

8. The process of claim 7 wherein said bolt is Grade 5 and when its shaft has a diameter of about five-sixteenths inches, the polygonal slot in the head has a maximum diagonal dimension not substantially greater than five-sixteenths inches.

9. The process of claim 7 wherein said bolt is Grade 5 and when its shaft has a diameter of about three-eighths inches, the polygonal slot in the head has a maximum diagonal dimension not substantially greater than three-eighths inches.

10. The process of claim 1 wherein the gun is an impact tool having a minimum capacity of about two hundred seventy-five foot pounds when operating with an electrical source input of about twenty-four to about twenty-eight volts DC and a minimum of about thirty amperes.

11. The process of claim 10 wherein said bolt is Grade 5 when its shaft has a diameter of about five-sixteenths inches, a polygonal slot in the head having a maximum diagonal dimension not substantially greater than five-sixteenths inches.

12. The process of claim 10 wherein said bolt is Grade 5 and when its shaft has a diameter of about three-eighths inches, a polygonal slot in the head having a maximum diagonal dimension not substantially greater than three-eighths inches.

13. The process of claim 10 wherein the bolt is Grade 5 and the effective diameter of the engaging means applying torque to the bolt head is not substantially greater than the diameter of the bolt shaft.

* * * * *